US009047016B2

(12) United States Patent
Orikasa et al.

(10) Patent No.: US 9,047,016 B2
(45) Date of Patent: Jun. 2, 2015

(54) STORAGE SYSTEM FOR CONTROLLING ASSIGNMENT OF STORAGE AREA TO VIRTUAL VOLUME STORING SPECIFIC PATTERN DATA

(75) Inventors: Daisuke Orikasa, Odawara (JP); Yutaka Takata, Ninomiya (JP); Shintaro Inoue, Odawara (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 13/238,870

(22) Filed: Sep. 21, 2011

(65) Prior Publication Data

US 2012/0011311 A1 Jan. 12, 2012

Related U.S. Application Data

(63) Continuation of application No. 12/292,604, filed on Nov. 21, 2008.

(30) Foreign Application Priority Data

Oct. 1, 2008 (JP) .................................. 2008-256314

(51) Int. Cl.
G06F 12/00 (2006.01)
G06F 3/06 (2006.01)

(52) U.S. Cl.
CPC ............ *G06F 3/0608* (2013.01); *G06F 3/0631* (2013.01); *G06F 3/0689* (2013.01)

(58) Field of Classification Search
CPC ... G06F 3/0608; G06F 3/0665; G06F 3/0631; G06F 3/0644
See application file for complete search history.

(56) References Cited

U.S. PATENT DOCUMENTS

| 5,623,693 | A | * | 4/1997 | Ashton et al. ...................... 710/5 |
| 6,070,174 | A | * | 5/2000 | Starek et al. ........................... 1/1 |
| 6,092,168 | A | * | 7/2000 | Voigt .............................. 711/170 |
| 6,745,305 | B2 | | 6/2004 | McDowell |
| 7,032,093 | B1 | * | 4/2006 | Cameron ....................... 711/170 |
| 7,225,314 | B1 | | 5/2007 | Bonwick et al. |
| 7,328,453 | B2 | | 2/2008 | Merkle et al. |
| 7,594,137 | B2 | | 9/2009 | Kawaguchi et al. |
| 7,603,532 | B2 | | 10/2009 | Rajan et al. |
| 7,681,002 | B2 | | 3/2010 | Seki et al. |

(Continued)

FOREIGN PATENT DOCUMENTS

| JP | 200315915 | 7/2001 |
| JP | 2007-102760 A | 4/2007 |

(Continued)

OTHER PUBLICATIONS

B. May, Technical Report: NetApp Deduplication for FAS Deployment and Implementation Guide, Network Appliance, Inc., Apr. 16, 2008, TR-3505, 4th Revision, pp. ii-23.

*Primary Examiner* — Matthew Bradley
*Assistant Examiner* — Ramon A Mercado
(74) *Attorney, Agent, or Firm* — Mattingly & Malur, PC

(57) ABSTRACT

A storage system comprises a storage medium including a plurality of physical storage areas. The storage system controls a host computer to recognize a logical volume having a plurality of virtual storage areas, reads the data from the physical storage area assigned to the virtual storage area of the logical volume, determines whether or not the read data includes only the specific pattern data, and cancels the assignment of the physical storage area to the virtual storage area if the read data includes only the specific pattern data.

16 Claims, 11 Drawing Sheets

(56) References Cited

U.S. PATENT DOCUMENTS

| | | |
|---|---|---|
| 7,979,663 B2 * | 7/2011 | Tomonaga .................... 711/170 |
| 2004/0030822 A1 | 2/2004 | Rajan et al. |
| 2004/0230766 A1 | 11/2004 | Cameron |
| 2005/0091215 A1 * | 4/2005 | Chandra et al. .................. 707/10 |
| 2005/0091455 A1 | 4/2005 | Kano et al. |
| 2005/0182890 A1 | 8/2005 | Yamagami |
| 2005/0257020 A1 * | 11/2005 | Kashyap et al. ............. 711/170 |
| 2006/0010169 A1 * | 1/2006 | Kitamura ....................... 707/200 |
| 2006/0075187 A1 | 4/2006 | Nakashima et al. |
| 2006/0085471 A1 | 4/2006 | Rajan et al. |
| 2007/0079098 A1 | 4/2007 | Kitamura |
| 2007/0130423 A1 | 6/2007 | Liu et al. |
| 2007/0150690 A1 * | 6/2007 | Chen et al. .................... 711/170 |
| 2007/0168634 A1 | 7/2007 | Morishita et al. |
| 2007/0245114 A1 * | 10/2007 | Kakui et al. .................. 711/170 |
| 2008/0098050 A1 * | 4/2008 | Geelen .......................... 707/205 |
| 2008/0109616 A1 | 5/2008 | Taylor |
| 2008/0243860 A1 | 10/2008 | Cannon et al. |
| 2009/0089518 A1 | 4/2009 | Hobbet et al. |
| 2009/0300302 A1 | 12/2009 | Vaghani |
| 2010/0011368 A1 * | 1/2010 | Arakawa et al. ............. 718/104 |
| 2010/0070734 A1 | 3/2010 | Agombar et al. |

FOREIGN PATENT DOCUMENTS

| | | |
|---|---|---|
| JP | 2007-193573 A | 8/2007 |
| JP | 2007-199922 A | 8/2007 |
| JP | 2008-146574 A | 6/2008 |
| WO | 99/32995 A1 | 7/1999 |

* cited by examiner

ASSIGNMENT MANAGEMENT TABLE

| VIRTUAL PAGE | REAL PAGE | DISCARD MARK |
|---|---|---|
| 0x0000 | 0x0000 | 1 |
| 0x5000 | - | 0 |
| ⋮ | ⋮ | ⋮ |
| ⋮ | ⋮ | ⋮ |

PAIR MANAGEMENT TABLE

| PRIMARY VOLUME | | | SECONDARY VOLUME | | |
|---|---|---|---|---|---|
| DEVICE ID | VOL ID | TYPE | DEVICE ID | VOL ID | TYPE |
| ST01 | VOL01 | VIRTUAL | ST02 | VOL11 | VIRTUAL |
| ST01 | VOL02 | REAL | ST02 | VOL12 | VIRTUAL |

STORAGE SYSTEM FOR CONTROLLING ASSIGNMENT OF STORAGE AREA TO VIRTUAL VOLUME STORING SPECIFIC PATTERN DATA

CROSS REFERENCES TO RELATED APPLICATIONS

This application is a continuation application of U.S. Ser. No. 12/292,604, filed Nov. 21, 2008, and relates to and claims priority from Japanese Patent Application No. 2008-256314, filed on Oct. 1, 2008, the entire disclosures of which are incorporated herein by reference.

BACKGROUND OF THE INVENTION

1. Field of the Invention

The present invention relates to a technology for managing a storage area in a storage system as disclosed in the specification of this application. More particularly, the invention relates to management of assigning a real storage area to a virtual storage area.

2. Description of the Related Art

In a computer system using a computer and a storage system, the amount of data stored in the storage system generally tends to increase. To cope with this increase, if a storage system having a sufficient data storage capacity is introduced from the beginning, a high introduction cost arises. On the other hand, if the data storage capacity of the storage system is expanded sequentially along with the increasing amount of data, a management cost for expansion arises. To reduce such introduction cost and management cost, a technology for the storage system to provide a virtual storage area to the computer was disclosed (e.g., refer to JP-A-2003-15915).

With this technology, the virtual storage area having sufficient data storage capacity is defined, but the physical storage area (e.g., storage area on a hard disk drive) is not assigned to all the virtual storage area. Thereafter, physical storage areas are sequentially assigned to the virtual storage area in accordance with a data write request into the virtual storage area. Since the physical storage area is not assigned to the unused range of the defined virtual storage area, the physical storage area can be effectively used.

SUMMARY OF THE INVENTION

If receiving a data read request from the range of the virtual storage area as above, to which the physical storage area is not assigned, the storage system returns specific pattern data (e.g., consecutive "0"). Therefore, if the data is read from the entire virtual storage area and stored in a tape storage medium, the above specific pattern data is stored as the data read from the range to which the physical storage area is not assigned, for example. Thereafter, if the data stored in the tape storage medium is restored in the virtual storage area, the above specific pattern data is written into the virtual storage area, so that the physical storage area is assigned to all the virtual storage area. As a result, the physical storage area cannot be effectively used.

The typical invention as disclosed in this application provides a storage system for storing the data written by a host computer, the storage system comprising a storage medium including a plurality of physical storage areas, and a controller for controlling the write of the data into the storage medium and the read of the data from the storage medium, characterized in that the controller controls the host computer to recognize a first logical volume, a storage area space of the first logical volume includes a plurality of address ranges, and the controller holds information for managing the assignment of each physical storage area to each address range, determines whether or not the physical storage area is assigned to the address range specified by a received data write request, if the data write request for any of the address ranges of the first logical volume is received, assigns the physical storage area not yet assigned to any of the address ranges to the specified address range if the physical storage area is not assigned to the specified address range, writes write requested data in the data write request into the physical storage area assigned to the specified address range, reads the data from the physical storage area assigned to the address range of the first logical volume if a predetermined condition is satisfied, determines whether or not the read data includes the data of a predetermined pattern only, cancels the assignment of the physical storage area to the address range if the read data includes the data of the predetermined pattern only, determines whether or not the physical storage area is assigned to the address range specified by a data read request if the data read request for any of the address ranges of the first logical volume is received, sends the read data to a sender of the data read request by reading the data from the physical storage area assigned to the specified address range if the physical storage area is assigned to the specified address range, and sends the data of the predetermined pattern to the sender of the data read request if the physical storage area is not assigned to the specified address range.

With one embodiment of the invention, it is possible to make effective use of the physical storage area by preventing the physical storage area from being assigned to the range into which specific pattern data is written.

DESCRIPTION OF THE PREFERRED EMBODIMENTS

First of all, a first embodiment of the present invention will be described below in detail using the drawings.

Figure 1:
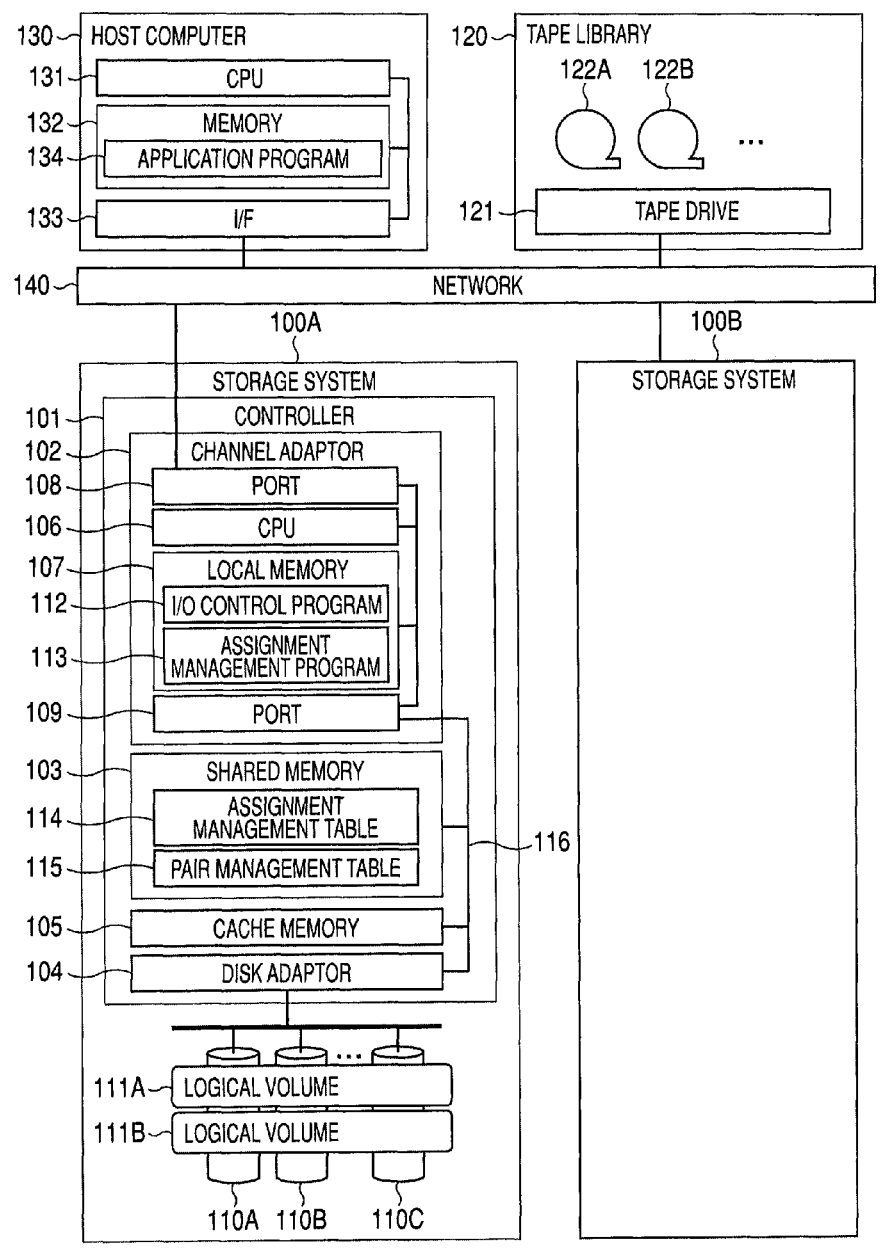
FIG. 1 is a block diagram showing the configuration of a computer system according to a first embodiment of the present invention.

FIG. 1 is a block diagram showing the configuration of a computer system according to the first embodiment of the invention.

The computer system of this embodiment comprises a storage system 100A, a storage system 100B, a tape library 120, a host computer 130 and a network 140 for interconnecting them.

The storage system 100A stores the data written by the host computer 130. More specifically, the storage system 100A comprises the disk drives 110A to 110C and a controller 101.

Each of the disk drives 110A to 110C is a storage device comprising a storage medium for storing the data written by the host computer 130. In the following, in giving the explanation common to the disk drives 110A to 110C, they are generically called a disk drive 110. Though three disk drives 110 are shown in FIG. 1, the storage system 100A may comprise any number of disk drives 110. A plurality of disk drives 110 may constitute a RAID (Redundant Array of Inexpensive Disks).

The disk drive 110 of this embodiment is a hard disk drive having a magnetic disk as the storage medium, but may be replaced with any type of storage device. For example, the disk drive 110 may be replaced with a non-volatile semiconductor storage device such as a flash memory.

The controller 101 controls the write of the data into the disk drive 110 and the read of the data from the disk drive 110. The controller 101 comprises a channel adaptor 102, a shared memory 103, a disk adaptor 104, a cache memory 105 and an internal network 116 for interconnecting them.

The channel adaptor 102 comprises a CPU 106, a local memory 107, a port 108 and a port 109.

The CPU 106 is a processor for executing a program stored in the local memory 107.

The local memory 107 stores the program executed by the CPU 106 and the data referred to by the CPU 106. The local memory 107 of this embodiment stores at least an I/O control program 112 and an assignment management program 113. These will be described later in detail. In the following explanation, a process performed by the I/O control program 112 or the assignment management program 113 is actually performed on the CPU 106 that executes the program.

The port 108 is connected to the network 140, and used for communication with the host computer 130. The port 109 is connected to the internal network 116 and used for communication with the disk adaptor 104.

The shared memory 103 stores control information and so on referred to by the channel adaptor 102 or the like. The shared memory 103 of this embodiment stores at least an assignment management table 114 and a pair management table 115. These will be described later in detail.

The disk adaptor 104 is connected to the disk drive 110, and controls the write and read of the data into and from the disk drive 110 under the control of the channel adaptor 102.

The cache memory 105 temporarily stores the data written into the disk drive 110 and the data read from the disk drive 110.

The storage system 100A may comprise a plurality of channel adaptors 102, a plurality of shared memories 103, a plurality of disk adaptors 104 and a plurality of cache memories 105.

The internal network 116 is realized by a bus or a fabric switch, for example.

The controller 101 manages the physical storage areas realized by the storage medium of the disk drive 110 as a plurality of logical volumes 111. Each of the logical volumes 111A and 111B as shown in FIG. 1 is one of the plurality of logical volumes 111. The controller 101 can manage any number of logical volumes 111. The logical volume 111 will be described later in detail (see FIG. 2).

The configuration of the storage system 100B is the same as the storage system 100A, and not illustrated and described here.

In the following, in giving the explanation common to the storage systems 100A and 100B, they are generically called a storage system 100.

The tape library 120 is mainly used to back up the data stored in the storage system 100. The tape library 120 comprises a tape drive 121 and one or more tape storage media 122.

Each tape storage medium 122 may be one volume of tape stored in a cartridge. Each of the tape storage media 122A and 122B as shown in FIG. 1 is one of the plurality of tape storage media 122.

The tape drive 121 mounts the tape storage medium 122 and performs the write of the data into the tape storage medium 122 and the read of the data from the tape storage medium 122. For example, the tape drive 121 may write the duplicate of the data stored in the logical volume 111 into one or more tape storage media 122.

The host computer 130 comprises a CPU 131, a memory 132 and an interface 133 which are interconnected.

The CPU 131 is a processor for executing a program stored in the memory 132.

The memory 132 stores the program executed by the CPU 131 and the data referred to by the CPU 131. The memory 132 of this embodiment stores at least an application program 134.

The interface 133 is connected to the network 140 and performs the communication with the storage system 100.

The CPU 131 executes the application program 134, and sends a data write request or data read request into or from the logical volume 111 via the interface 133 to the storage system 100, as needed.

The network 140 may be any type. Typically, the network 140 is a so-called storage area network (SAN) to which a fibre channel protocol is applied. In this case, the network 140 may comprise a fibre channel switch (not shown).

Figure 2:
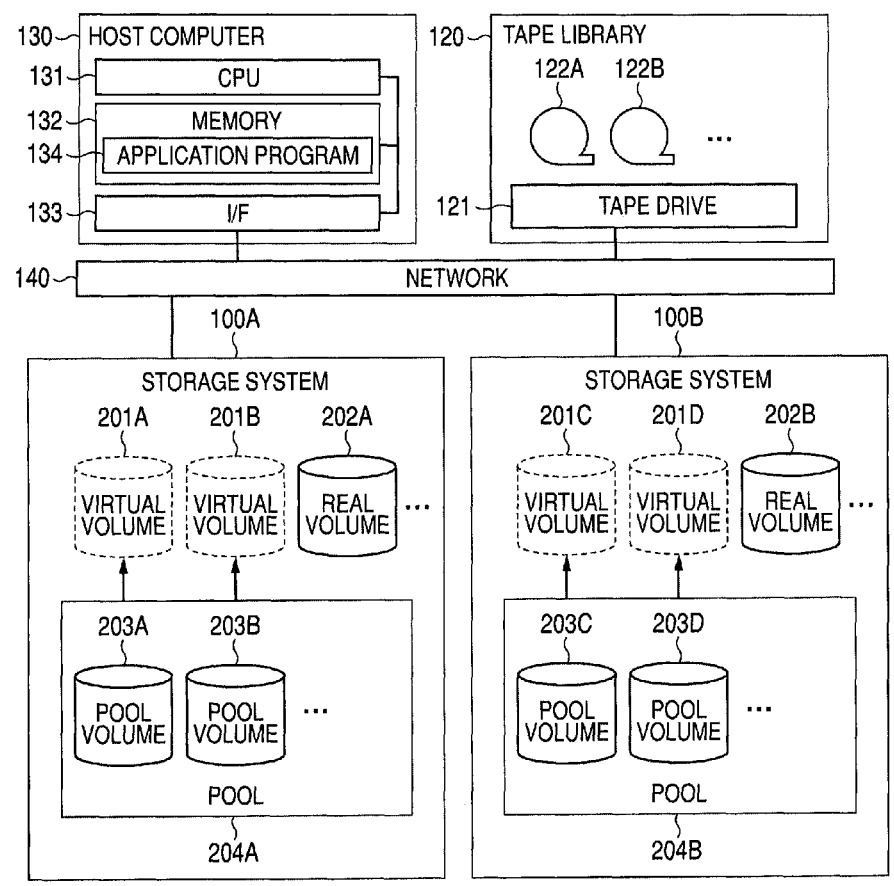
FIG. 2 is an explanatory view of a logical volume managed by a storage system according to the first embodiment of the invention.

FIG. 2 is an explanatory view of the logical volume 111 managed by the storage system 100 according to the first embodiment of the invention.

The computer system as shown in FIG. 2 corresponds to that as shown in FIG. 1, but the hardware configuration unnecessary for the explanation of the logical volume 111 is not illustrated.

The controller 101 in the storage system 100 of this embodiment manages three types of logical volumes 111, namely, a virtual volume 201, a real volume 202 and a pool volume 203. More specifically, the storage system 100A manages a virtual volume 201A, a virtual volume 201B, a real volume 202A, a pool volume 203A and a pool volume 203B in an example of FIG. 2. The storage system 100B manages a virtual volume 201C, a virtual volume 201D, a real volume 202B, a pool volume 203C and a pool volume 203D.

In the following, in giving the explanation common to the virtual volumes 201A to 201D, they are generically called a virtual volume 201. Similarly, the real volumes 202A and 202B are generically called a real volume 202, and the pool volumes 203A to 203D are generically called a pool volume 203. The pools 204A and 204B as will be described later are also generically called a pool 204.

The controller 101 provides a storage area space of each real volume 202 to the host computer 130. The host computer 130 recognizes each real volume 202 as one storage device, and issues a data write request and a data read request for each real volume 202.

The physical storage area of the disk drive 110 is assigned to all the storage area space of each real volume 202. The controller 101 receiving a data write request or data read request for the real volume 202 performs the write or read of the data into or from the physical storage area assigned to the storage area corresponding to the address designated as access target by the received request.

Similarly, the controller 101 provides a storage area space of each virtual volume 201 to the host computer 130. The host computer 130 recognizes each virtual volume 201 as one storage device, and issues a data write request and a data read request for each virtual volume 201.

However, the physical storage area of the disk drive 110 may not be assigned to all the storage area space of each virtual volume 201 in some cases. The controller 101 can control the assignment of the physical storage area to any address range of the storage area space for each virtual volume 201.

Usually, at the point in time when the virtual volume 201 is created, the physical storage area is not assigned to any address range of the storage area space for the virtual volume 201. Thereafter, the controller 101 receiving a data write request at any address of the virtual volume 201 assigns the physical storage area to the address range including the address of the write target and stores the data in the assigned physical storage area.

The physical storage area is not directly assigned to the address range of the virtual volume 201, but the storage area space (more specifically the address range) of the pool volume 203 is assigned as will be described later. Thereby, the assignment of the physical storage area to the virtual volume 201 is implemented.

A process for writing or reading the data into or from the virtual volume 201 will be described later.

The pool volume 203 is the same logical volume 111 as the real volume 202. That is, the physical storage area of the disk drive 110 is assigned to all the storage area space of the pool volume 203.

However, the storage area space of the pool volume 203, unlike the real volume 202, is not directly provided to the host computer. The storage area space of the pool volume 203 is assigned to the storage area space of the virtual volume 201, as needed.

In this embodiment, one or more pool volumes 203 make up one pool 204. The pool 204 is associated with the virtual volume 201 as the supplier of the physical storage area. In the example of FIG. 2, the pool 204A is composed of a plurality of pool volumes 203 including the pool volumes 203A and 203B. The pool 204A is associated with the virtual volumes 201A and 201B.

In this example, when it is required to assign the physical storage area to the virtual volume 201A, the storage area space of any pool volume 203 (e.g., pool volume 203A) belonging to the pool 204A associated with the virtual volume 201A is assigned. When it is required to assign the physical storage area to the virtual volume 201B, the storage area space of any pool volume 203 (e.g., pool volume 203A) belonging to the pool 204A associated with the virtual volume 201B is assigned.

Similarly, the pool 204B is composed of a plurality of pool volumes 203 including the pool volumes 203C and 203D. The pool 204B is associated with the virtual volumes 201C and 201D.

Figures 3, 4, 5:
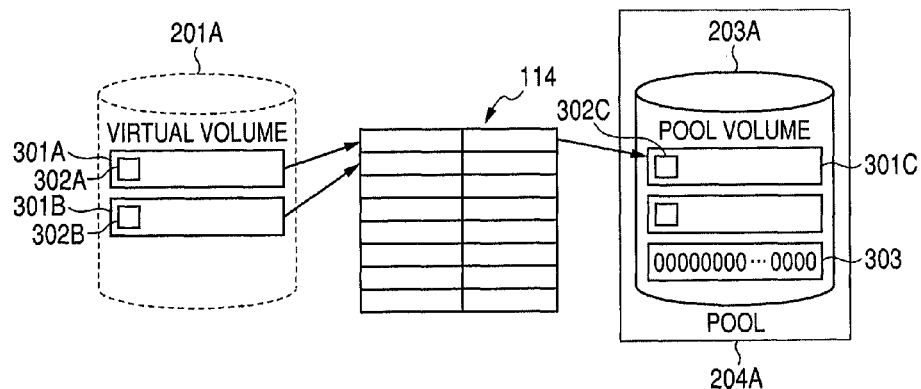
FIG. 3 is an explanatory view for assigning the physical storage area to the virtual volume according to the first embodiment of the invention.
FIG. 4 is an explanatory view of an assignment management table according to the first embodiment of the invention.
FIG. 5 is an explanatory view of a pair management table according to the first embodiment of the invention.

FIG. 3 is an explanatory view for assigning the physical storage area to the virtual volume 201 according to the first embodiment of the invention.

For the sake of simplification of the explanation, FIG. 3 shows an example in which the pool 204A is associated with the virtual volume 201A and the pool 204A includes the pool volume 203A only.

The assignment of the physical storage area to the storage area space of the virtual volume 201A is managed for each address range of predetermined size (e.g., a range of block address as will be described later). The address range of predetermined size is called a page. In other words, the page of the virtual volume 201 is the virtual storage area of predetermined size.

In the example of FIG. 3, the page 301C of the pool volume 203A is assigned to the page 301A of the virtual volume 201A. This assignment is managed by the assignment management table 114.

The physical storage area is assigned to all the pages of the pool volume 203A, as already described. Therefore, for example, if a data write request for any address within the page 301A is issued, the data is written into the physical storage area assigned to the page 301C. In this way, the physical storage area assigned to the page 301C can be regarded as being assigned via the assignment management table 114 to the page 301A. In other words, since the physical storage area is assigned to all the pages of the pool volume 203A, each page of the pool volume 203A can be regarded as the physical storage area.

On the other hand, no page of the pool volume 203A is assigned to the page 301B of the virtual volume 201A.

Specific pattern data is stored in a predetermined address range 303 (more correctly the physical storage area assigned to the address range 303) of the pool volume 203A. This specific pattern is predetermined. For example, the specific pattern data may be the data composed of "0" only. The predetermined address range 303 is not assigned to any page within the virtual volume 201A.

Each page may include a predetermined number of blocks. Herein, a block is the minimum unit of area designated as the data write target (data read object) by the data write request (or data read request). Each block has a fixed size (e.g., 512 bytes), and is identified by the block address. In the example of FIG. 3, the block 302C included in the page 301C is assigned to the block 302A included in the page 301A. In this case, the data written into the block 302A is actually stored in the physical storage area assigned to the block 302C.

On the other hand, the block 302B is included in the page 301B in the example of FIG. 3. However, since the page of the pool volume 203A is not assigned to the page 301B, the block of the pool volume 203A is not assigned to the block 302B.

FIG. 4 is an explanatory view of the assignment management table 114 according to the first embodiment of the invention.

The assignment management table 114 is stored in the shared memory 103, and includes information for managing the assignment of the physical storage area to the virtual volume 201. More specifically, the assignment management table 114 includes a virtual page 401, a real page 402 and a discard mark 403.

The virtual page 401 is information for identifying each page of the virtual volume 201. For example, the virtual page 401 may be the initial address of each page in the virtual volume 201.

The real page 402 is information for identifying the page of the pool volume 203 assigned to each page of the virtual volume 201. The real page 402, like the virtual page 401, may be the initial address of each page in the pool volume 203. If the page of the pool volume 203 is not assigned to a certain page of the virtual volume 201, an invalid value is registered as the real page 402 corresponding to the page of the virtual volume 201.

The discard mark 403 is a flag indicating discarding a page of the virtual volume 201 (i.e., deleting allocation of page of the pool volume 203 for page of the virtual volume 201). A page discard determination process and a page discard process using the discard mark 403 are explained in detail later.

In the example of FIG. 4, "0x0000" and "0x0000" are registered as the virtual page 401 and the real page 402 in the first entry of the assignment management table 114. On the other hand, "0x5000" and the invalid value are registered as the virtual page 401 and the real page 402 in the second entry. This reveals that the pages (e.g., page 301C in FIG. 3) corresponding to the range from the block address "0x0000" to "0x4FFF" in the pool volume 203A are assigned to the pages (e.g., page 301A in FIG. 3) corresponding to the range from the block address "0x0000" to "0x4FFF" in the virtual volume 201A, and the pages of the pool volume 203A are not assigned to the pages (e.g., page 301B in FIG. 3) corresponding to the range from the block address "0x5000" to "0x9FFF" in the virtual volume 201A.

FIG. 5 is an explanatory view of a pair management table 115 according to the first embodiment of the invention.

The pair management table 115 is stored in the shared memory 103, and includes information for managing a copy pair. Herein, the copy pair will be described below.

The copy pair is a set (pair) of the logical volume 111 and the logical volume 111 (i.e., copy target) for storing the duplicate of the data stored in the logical volume 111. For example, to back up the logical volume 111, the copy pair is created. The copy pair may be composed of two logical volumes 111 within one storage system 100, or two logical volumes 111 included in different storage systems 100.

Each of the logical volume 111 of copy source and the logical volume 111 of copy target may be the virtual volume 201 or the real volume 202. In the following, the logical volume 111 of copy source is called a primary volume and the logical volume 111 of copy target is called a secondary volume.

When the copy pair is newly created, all the data stored in the primary volume is read, and all the read data is written into the secondary volume. Thereafter, if the data of the primary volume is updated, the update is reflected to the secondary volume. Thereby, the consistency between the data stored in the primary volume and the data stored in the secondary volume is maintained.

Conversely, the data stored in the secondary volume may be copied to the primary volume. For example, if the data stored in the primary volume is lost due to a failure or malfunction, the data stored in the secondary volume can be copied to the primary volume to restore the data.

If the copy pair is created by two logical volumes 111, the information for managing the copy pair (in other words, the information for associating the two logical volumes 111) is registered in the pair management table 115.

The pair management table 115 includes a device ID of primary volume 501, a volume ID of primary volume 502, a type of primary volume 503, a device ID of secondary volume 504, a volume ID of secondary volume 505, and a type of secondary volume 506.

The device ID of primary volume 501 is an identifier of the storage system that stores the primary volume belonging to the copy pair.

The volume ID of primary volume 502 is an identifier of the primary volume belonging to the copy pair.

The type of primary volume 503 indicates which of the virtual volume 201 and the real volume 202 the primary volume belonging to the copy pair is.

The device ID of secondary volume 504 is an identifier of the storage system that stores the secondary volume belonging to the copy pair.

The volume ID of secondary volume 505 is an identifier of the secondary volume belonging to the copy pair.

The type of secondary volume 506 indicates which of the virtual volume 201 and the real volume 202 the secondary volume belonging to the copy pair is.

In the example of FIG. 5, "ST01", "VOL02", "real", "ST02", "VOL12" and "virtual" are stored as the device ID of primary volume 501, the volume ID of primary volume 502, the type of primary volume 503, the device ID of secondary volume 504, the volume ID of secondary volume 505, and the type of secondary volume 506 in the second entry of the pair management table 115. For example, when the identifier of the storage system 100A is "ST01", the identifier of the storage system 100B is "ST02", the identifier of the real volume 202A is "VOL02", and the identifier of the virtual volume 201D is "VOL12", the second entry reveals that the copy pair in which the real volume 202A is the primary volume and the virtual volume 201D is the secondary volume is created.

Next, the write of the data into the virtual volume 201 and the read of the data from the virtual volume 201 will be described below.

Figure 6:
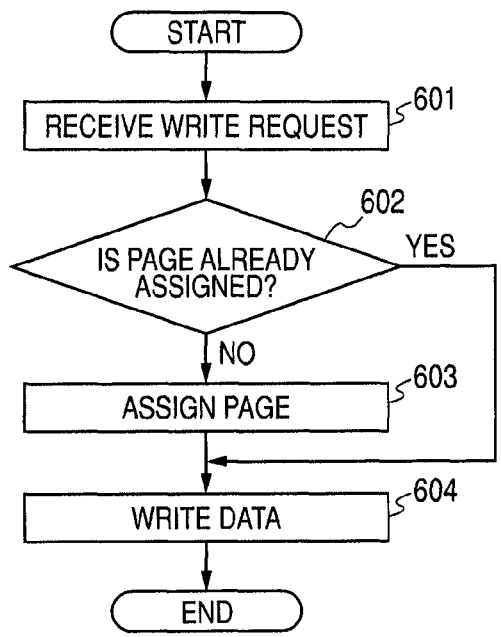
FIG. 6 is a flowchart showing a data write process according to the first embodiment of the invention.

FIG. 6 is a flowchart showing a data write process according to the first embodiment of the invention.

More specifically, FIG. 6 shows the process to be performed when the I/O control program 112 receives a data write request with the virtual volume 201 designated as the write target.

At first, the I/O control program 112 receives the data write request (step 601). This data write request includes the data to be written and the information for designating the address of the write target of the data.

This data write request may be sent from the host computer 130, by a pair control program (not shown) of any storage system 100 to perform the copy of data in the copy pair, or by the tape library 120 or backup control device (not shown) to restore the data from the tape storage medium.

Next, the I/O control program 112 determines whether or not the physical storage area is assigned to the page including the address of the write target (step 602). More specifically, the I/O control program 112 determines whether or not the valid value (i.e., address of any page in the pool volume 203) is registered in the real page 402 corresponding to the page including the address of the write target by referring to the assignment management table 114.

If it is determined at the step 602 that the invalid value is registered in the real page 402 corresponding to the page including the address of the write target, the physical storage area is not assigned to the page including the address of the write target. In this case, the I/O control program 112 assigns the physical storage area not yet assigned to any page to the page including the address of the write target (step 603).

More specifically, the I/O control program 112 selects the page not yet assigned to any page of the virtual volume from among the pages of the pool volume 203 corresponding to the virtual volume 201 of the write target and registers the address of the selected page in the real page 402 corresponding to the page including the address of the write target.

An assignment process at the step 603 may be performed by the assignment management program 113 receiving an instruction from the I/O control program 112.

Next, the I/O control program 112 writes the data at the address of the write target (step 604). More specifically, the I/O control program 112 specifies the physical storage area assigned to the address of the write target by referring to the assignment management table 114 and writes the data in the specified physical storage area.

On the other hand, if it is determined at the step 602 that the valid value is registered in the real page 402 corresponding to the page including the address of the write target, the physical storage area is assigned to the page including the address of the write target. In this case, the I/O control program 112 does not perform the step 603 and performs the step 604.

With the above, the data write process is ended.

In the above way, the physical storage area can be effectively used by suspending the assignment of the physical storage area to the logical volume until it is actually used (i.e., the data is written). Such a technique for dynamically assigning the physical storage area in accordance with the data write request is called an Allocation on Use (AoU).

Herein, referring to FIGS. 3 and 4, a specific example of the data write process will be described below.

For example, if the block 302A is designated as the write target, the I/O control program 112 determines that the page 301C of the pool volume 203A is assigned (i.e., the physical storage area is assigned) to the page 301A including the block 302A by referring to the assignment management table 114 (step 602). This determination is made based on the fact that the address of the designated block 302A is included in the range from "0x0000" to "0x4FFF".

In this case, the I/O control program 112 writes the data into the block 302C assigned to the block 302A (more correctly the physical storage area assigned to the block 302C) (step 604).

On the other hand, in the above example, if the real page 402 corresponding to the value "0x0000" of the virtual page 401 is the invalid value, the page of the pool volume 203A is not assigned to the page 301A including the block 302A. In this case, the I/O control program 112 assigns the page (e.g., page 301C) of the pool volume 203A to the page 301A. More specifically, the initial address "0x0000" of the page 301C is newly registered as the real page 402 corresponding to the value "0x0000" of the virtual page 401, for example, as shown in FIG. 4. Thereafter, the I/O control program 112 writes the data into the block 302C assigned to the block 302A (step 604).

Figure 7:
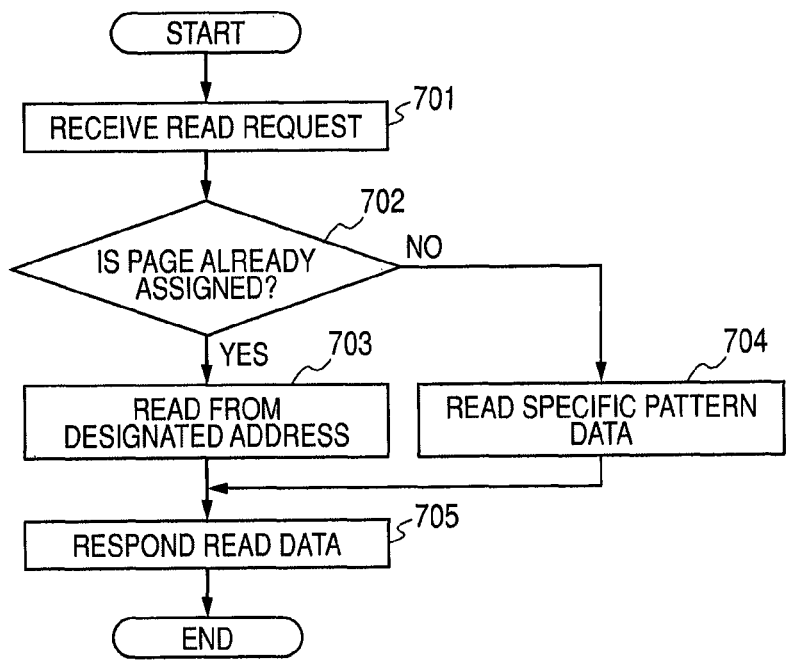
FIG. 7 is a flowchart showing a data read process according to the first embodiment of the invention.

FIG. 7 is a flowchart showing a data read process according to the first embodiment of the invention.

More specifically, FIG. 7 shows the process to be performed when the I/O control program 112 receives a data read request (i.e., request for reading the data from the virtual volume 201) with the virtual volume 201 designated as the read object.

At first, the I/O control program 112 receives a data read request (step 701). This data read request includes the information for designating the address of the read object of data (i.e., information indicating the address of the stored data to be read).

This data read request may be sent from the host computer 130, or by the pair control program (not shown) to perform the copy of the data in the copy pair.

Next, the I/O control program 112 determines whether or not the physical storage area is assigned to the page including the address of read object (step 702). This determination is performed in the same way as at the step 602 in FIG. 6.

If it is determined at the step 702 that the physical storage area is assigned to the page including the address of the read object, the I/O control program 112 reads the data from the address of read object (step 703). More specifically, the I/O control program 112 specifies the physical storage area assigned to the address of the read object by referring to the assignment management table 114, and reads the data from the physical storage area.

On the other hand, if it is determined at the step 702 that the physical storage area is not assigned to the page including the address of the read object, the I/O control program 112 reads the specific pattern data stored in a predetermined address range (step 704).

Then, the I/O control program 112 sends the data read at the step 703 or the step 704 as a response to the data read request to the request source (step 705).

Herein, referring to FIGS. 3 and 4, a specific example of the data read process will be described below.

For example, if the block 302A is designated as the read object, the I/O control program 112 determines that the page 301C of the pool volume 203A is assigned (i.e., the physical storage area is assigned) to the page 301A including the block 302A by referring to the assignment management table 114 (step 702).

In this case, the I/O control program 112 reads the data stored in the block 302C assigned to the block 302A (more correctly the physical storage area assigned to the block 302C) (step 703), and sends the data to the request source (step 705).

On the other hand, for example, if the block 302B is designated as the read object, the I/O control program 112 determines that the page of the pool volume 203A is not assigned (i.e., the physical storage area is not assigned) to the page 301B including the block 302B by referring to the assignment management table 114 (step 702).

In this case, the I/O control program 112 reads the specific pattern data (e.g., data composed of consecutive "0" only) stored in the address range 303 (step 704), and sends the data to the request source (step 705).

Herein, the problems to be solved by the invention and the forms for solving the problems will be outlined below by referring to the above example.

For example, a process for writing the duplicate of the data stored in the virtual volume 201 into the tape storage medium 122 for backup may be performed. In this case, the data stored in the virtual volume 201 is read as shown in FIG. 7, and written into the tape storage medium 122. At this time, the specific pattern data is sent in response to a read request for the page to which the physical storage area is not assigned among the pages of the virtual volume 201. Therefore, the specific pattern data sent in response in the above way is stored in the tape storage medium 122, as the data read from the page to which the physical storage area is not assigned.

Thereafter, if it is desired that the data stored in the tape storage medium 122 is restored in the virtual volume 201, the data stored in the tape storage medium 122 is read and written into the virtual volume 201. At this time, the specific pattern data stored in the tape storage medium 122 is all read and written into the virtual volume 201. At this time, since the process for writing the read specific pattern data is performed, the physical storage area for storing the specific pattern data is assigned to the page of the virtual volume 201 and the specific pattern data is written, as shown in FIG. 6.

In this way, the physical storage area is assigned by restore to the page to which the physical storage area is not assigned before restore. Thereby, the feature of the AoU technique to make effective use of the physical storage area is lost.

The above problem also occurs on the data copy between the copy pair.

For example, when the copy pair in which the primary volume is the virtual volume 201 and the secondary volume is the real volume 202 is created, all the data stored in the virtual volume 201 is firstly read and stored in the real volume 202. At this time, the specific pattern data is stored in the real volume 202, as the data read from the page to which the physical storage area is not assigned, in the same way as in the above case of the tape storage medium.

Thereafter, if the data of the secondary volume is restored to the primary volume, the specific pattern data stored in the real volume 202 is all read and written into the virtual volume 201, in the same way as in the above case of the tape storage medium. At this time, the physical storage area for storing the specific pattern data is assigned to the page of the virtual volume 201.

To avoid such a problem, in this embodiment, the specific pattern data once written is detected, whereby the assignment of the physical storage area to the page storing only the specific pattern data is canceled. This process will be described below.

Figure 8:
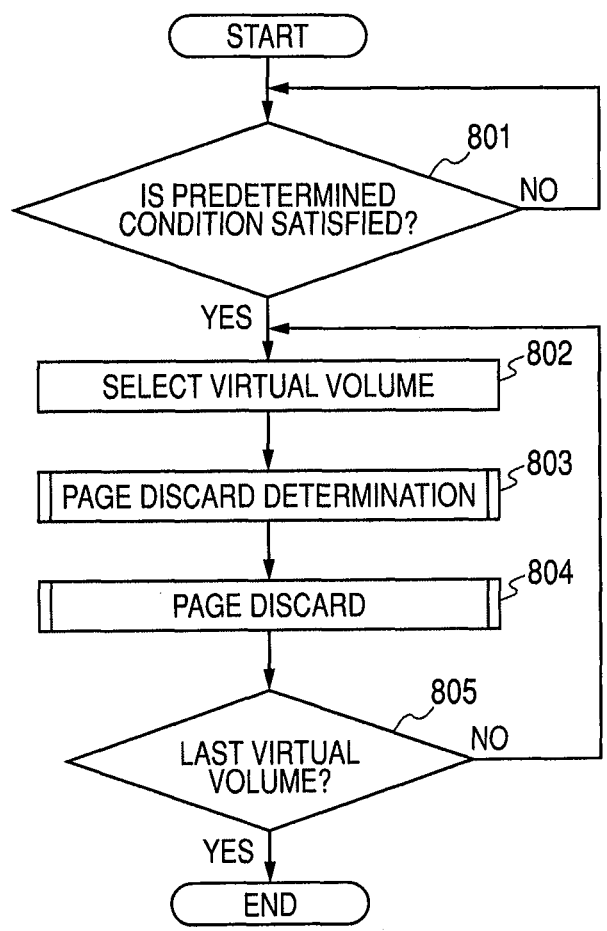
FIG. 8 is a flowchart showing a pool JOB according to the first embodiment of the invention.

FIG. 8 is a flowchart showing a pool JOB according to the first embodiment of the invention.

The pool JOB is performed by the assignment management program 113 of each storage system 100.

The assignment management program 113 firstly determines whether or not a predetermined condition is satisfied (step 801). For example, the assignment management program 113 may determine that the predetermined condition is satisfied for each pool 204, if the percentage of the total amount of the page already assigned to the virtual volume 201 to the total storage capacity of the pool 204 exceeds a predetermined threshold.

If it is determined at the step 801 that the predetermined condition is not satisfied, the step 801 is repeated until the predetermined condition is satisfied.

If it is determined at the step 801 that the predetermined condition is satisfied, the assignment management program 113 selects one of the virtual volumes 201 associated with the pool 204, for which the predetermined condition is satisfied (step 802).

Then, the assignment management program 113 performs a page discard determination process for the selected virtual volume 201 (step 803). The page discard determination process will be described later (see FIG. 9).

Then, the assignment management program 113 performs a page discard process for the selected virtual volume 201 (step 804). The page discard process will be described later (see FIG. 11).

Next, the assignment management program 113 determines whether or not the virtual volume 201 selected at the step 801 is the last, in other words, the steps 803 and 804 are performed for all the virtual volumes 201 associated with the pool 204 for which it is determined that the predetermined condition is satisfied at the step 801 (step 805).

If it is determined at the step 805 that the virtual volume 201 selected at the step 801 is not the last, the process returns to the step 802. In this case, at the step 802, the assignment management program 113 selects one of the remaining virtual volumes 201. The assignment management program 113 repeats the steps 802 to 805 until the page discard determination process (step 803) and the page discard process (step 804) are performed for all the virtual volumes 201 associated with the pool 204 for which it is determined that the predetermined condition is satisfied at the step 801.

If it is determined at the step 805 that the virtual volume 201 selected at the step 801 is the last, the assignment management program 113 ends the pool JOB.

Herein, the variation of the determination at the step 801 will be described below. Though in the above example it is determined that the predetermined condition is satisfied if the percentage of the total amount of the page assigned to the virtual volume 201 exceeds the predetermined threshold, the determination may be made by other methods.

For example, if the percentage of the total amount of the page with the physical storage area already assigned to the total capacity defined in the certain virtual volume 201 exceeds the predetermined threshold, it may be determined that the predetermined condition is satisfied. In this case, the virtual volume 201 for which the above percentage exceeds the predetermined threshold is selected at the step 802.

Or when a predetermined timing arrives, it may be determined that the predetermined condition is satisfied. More specifically, when a predetermined time passes since the previous pool JOB is executed, or when a predetermined time arrives, it may be determined that the predetermined condition is satisfied for all the pools 204 within the storage system 100. In this case, the steps 802 to 805 are repeatedly performed for all the virtual volumes unless they are not associated with any pool 204.

The above predetermined timing may be the timing when a pool optimization process is performed. The pool optimization process is the process for randomizing the correspondence between the unassigned page of the virtual volume 201 and the unassigned page within the pool 204.

Or the user or manager of the storage system 100 may instruct the pool JOB to be executed by designating the pool 204 or the virtual volume 201. More specifically, the user or manager may send a pool JOB execution instruction including the designation of the pool 204 or virtual volume 201 to the storage system 100, using the host computer 130, for example. The assignment management program 113 of the storage system receiving this instruction determines that the predetermined condition is satisfied for the designated pool 204 or virtual volume 201 (step 801).

Or if the copy from the real volume 202 to the virtual volume 201 is performed in the copy pair, it may be determined that the predetermined condition is satisfied. This is because there are some cases where the physical storage area is assigned to store the specific pattern data by the copy from the real volume 202 to the virtual volume 201, as already described.

More specifically, for example, the assignment management program 113 may determine at the step 801 whether or not the copy from the real volume 202 to the virtual volume 201 is performed, and may further determine whether or not the copy source is the real volume 202 and the copy target is the virtual volume 201 if it is determined that the copy is performed. It is determined whether or not each logical volume belongs to the copy pair, and if so, the attribute of the copy pair can be known by referring to the pair management table 115.

As a result of the above determination, if it is determined that the copy source is the real volume 202 and the copy target is the virtual volume 201, the virtual volume 203 of the copy target is selected at the step 802.

Or if the data read from the tape storage medium is copied to the virtual volume 201, it may be determined that the predetermined condition is satisfied. This is because there are some cases where the physical storage area is assigned to store the specific pattern data by the copy from the tape storage medium to the virtual volume 201, as already described. In this case, the virtual volume 203 of the copy target is selected at the step 802.

Figure 9:
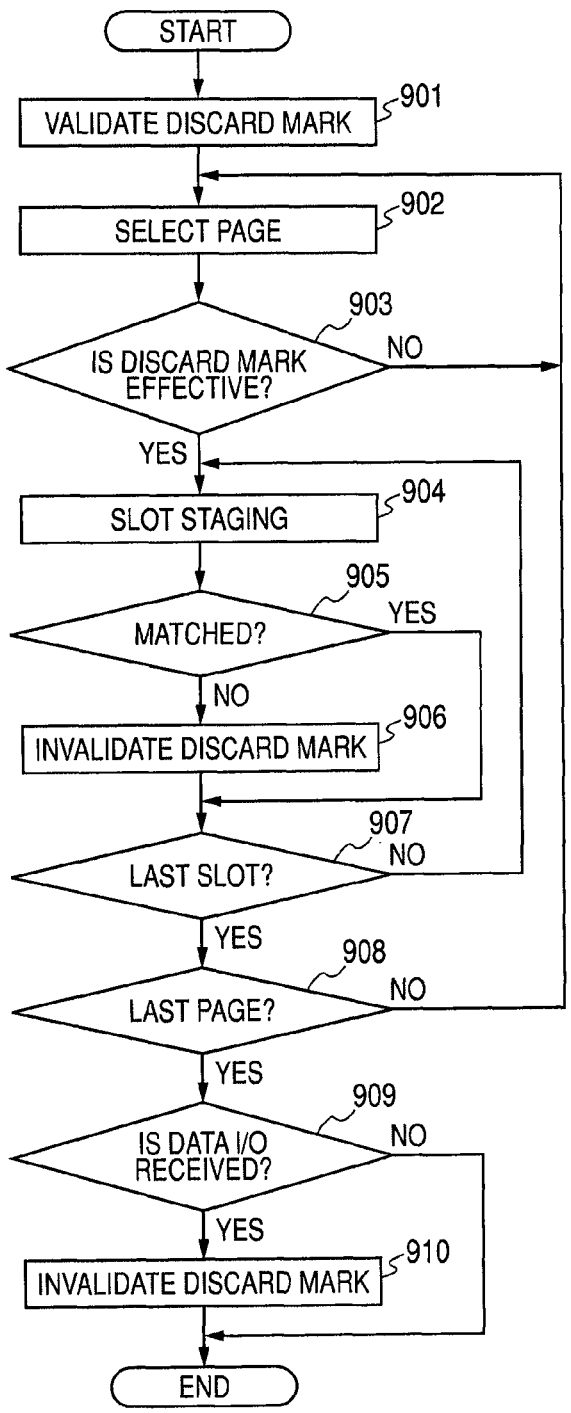
FIG. 9 is a flowchart showing a page discard determination process according to the first embodiment of the invention.

FIG. 9 is a flowchart showing the page discard determination process according to the first embodiment of the invention.

The page discard process as shown in FIG. 9 is performed at the step 803 of the pool JOB as shown in FIG. 8.

At first, the assignment management program 113 validates the value of the discard mark 403 corresponding to the page to which the physical storage area is already assigned among all the pages of the virtual volume 201 selected at the step 802 (step 901). For example, the discard mark 403 is valid when the value is "1" and invalid when the value is "0", or may be reversely represented.

Next, the assignment management program 113 selects one of the pages of the selected virtual volume 201 (step 902). At the step 902 that is performed for the first time after the start of the page discard determination process, the first page of the virtual volume 201 may be selected.

Next, the assignment management program 113 determines whether or not the value of the discard mark 403 corresponding to the selected page is valid (step 903).

If it is determined at the step 903 that the value of the discard mark 403 corresponding to the selected page is invalid, the physical storage area is not assigned to the page, or the assignment of the physical storage area to the page must not be canceled. Therefore, the assignment management program 113 does not perform the process following the step 904 (i.e., the process for canceling the assignment of the physical storage area to the selected page) and returns to the step 902.

On the other hand, if it is determined at the step 903 that the value of the discard mark 403 corresponding to the selected page is valid, the assignment management program 113 selects one of the slots in the selected page, and stages the data of the slot (step 904). For example, at the step 904 that is performed for the first time after the page is selected, the first slot of the selected page may be selected.

The slot is a management unit of data within the page. One page is divided into a predetermined number of slots. A comparison between the data stored in the page and the specific pattern data is made for each slot (see FIG. 10).

The staging of the data in the slot means reading the data in the slot and temporarily storing it in the memory. The data read from the slot may be stored in the local memory 107, the shared memory 103 or the cache memory 105.

Next, the assignment management program 113 compares the data read from the slot and the specific pattern data, and determines whether or not they are matched (step 905). This comparison may be made by any method. This comparison will be described later in detail (see FIG. 10).

If it is determined at the step 905 that the data read from the slot and the specific pattern data are unmatched, the data other than the specific pattern data is stored in the physical storage area assigned to the selected page. That is, the assignment cannot be canceled. Therefore, the assignment management program 113 changes the value of the discard mark 403 corresponding to the selected page to the invalid value (step 906).

Next, the assignment management program 113 determines whether or not the selected slot is the last slot of the selected page (step 907).

If it is determined at the step 907 that the selected slot is not the last slot of the selected page, there is a slot which is not compared with the specific pattern data among the slots of the selected page. Therefore, the process returns to the step 904. At the step 904, one of the unselected slots (e.g., the next slot to the previously selected slot) is selected.

On the other hand, if it is determined at the step 907 that the selected slot is the last slot of the selected page, the comparison between all the slots within the selected page (in other words, all the data) and the specific pattern data is ended. In this case, the assignment management program 113 determines whether or not the selected page is the last page within the selected virtual volume 201 (step 908).

If it is determined at the step 908 that the selected page is not the last page within the selected virtual volume 201, there is a page for which it is not determined whether or not the assignment of the physical storage area is canceled among the pages within the selected virtual volume 201. Therefore, the process returns to the step 902. At the step 902, one of the unselected pages (e.g., the next page to the previously selected page) is selected.

If it is determined at the step 908 that the selected page is the last page within the selected virtual volume 201, it has been determined whether or not the assignment of the physical storage area is canceled for all the pages within the selected virtual volume 201. In this case, the assignment management program 113 determines whether or not a data I/O request (i.e., data write request or data read request) for any page within the virtual volume 201 is performed after the step 901 for the currently selected virtual volume 201 (step 909).

If it is determined at the step 909 that the data write request is performed, there is a high possibility that data other than the specific pattern data is written into the page in accordance with the data write request. On the other hand, if it is determined that the data read request is performed, there is a high possibility that the data write request for the page from which the data is read is performed immediately after the read. This is because an operating system (OS) designed to necessarily perform the data read request for the area of the write target immediately before the data write request is performed operates on the host computer 130. That is, there is a possibility that the data write request is performed immediately after the data read request is performed, and the data other than the specific pattern data is written into the page.

Accordingly, to prevent the cancellation of assignment of the physical storage area storing the data other than the specific pattern data to the page, it is demanded that the assignment of the physical storage area is not canceled for the page for which the data I/O request is performed.

Therefore, if it is determined at the step 909 that the data I/O request is performed, the assignment management program 113 changes the value of the discard mark 403 corresponding to the page subjected to the data I/O request to the invalid value (step 910).

On the other hand, if it is determined at the step 909 that the data I/O request is not performed, the assignment management program 113 does not perform the step 910.

In the example of FIG. 9, the steps 909 and 910 are performed after the step 908. However, actually, it is desirable that the assignment management program 113 monitors the presence or absence of performing the data I/O request at any time during the period from the start of the page discard determination process until the end of the page discard process, and changes the discard mark 403 of the page subjected to the request to the invalid value, when the data I/O request is performed.

With the above, the assignment management program 113 ends the page discard determination process.

Figure 10:
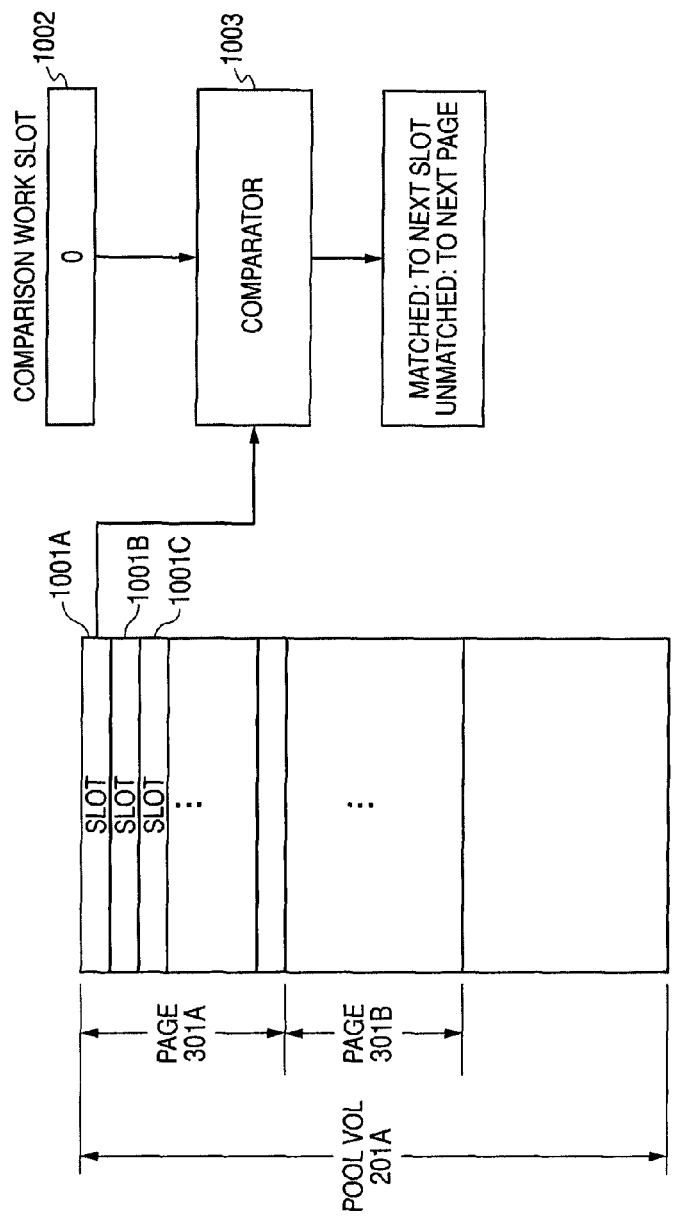
FIG. 10 is an explanatory view for making the comparison of data according to the first embodiment of the invention.

FIG. 10 is an explanatory view for making the comparison of data according to the first embodiment of the invention.

FIG. 10 shows the comparison of data in the virtual volume 201A as an example, but the comparison of data is similarly made in other virtual volumes 201.

The virtual volume 201A includes a plurality of pages of predetermined size, for example, page 301A and page 301B, as already described with reference to FIG. 3. Each page includes a plurality of slots of predetermined size. For example, the page 301A includes the slots 1001A to 1001C.

For example, one page may include 168 slots, and one slot may include 512 blocks (i.e., 256 kilobytes), but these values are a few examples and any other values may be set.

A comparison work slot 1002 is prepared for the memory (e.g., local memory 107) to store the specific pattern data. For example, the data stored in a predetermined address range 303 may be copied to the comparison work slot 1002.

A comparator 1003 compares the data of each slot and the data of the comparison work slot 1002 to determine whether or not they are the same. The comparator 1003 may be realized by dedicated hardware, or by software.

For example, the data of the slot 1001A is firstly copied to the memory (step 904). The comparator 1003 compares the data of the slot 1001A and the specific pattern data stored in the comparison work slot 1002 to determine whether or not they are the same (step 905). If they are the same, the next slot 1001B is copied to the memory and the above process is repeated.

For example, if the data of the slot 1001B and the specific pattern data stored in the comparison work slot 1002 are not the same, the value of the discard mark 403 corresponding to the page 301A is changed to the invalid value. And the next page 301B is selected without making the above comparison for the remaining slots (i.e., the slots following the slot 1001C) of the page 301A.

Figure 11:
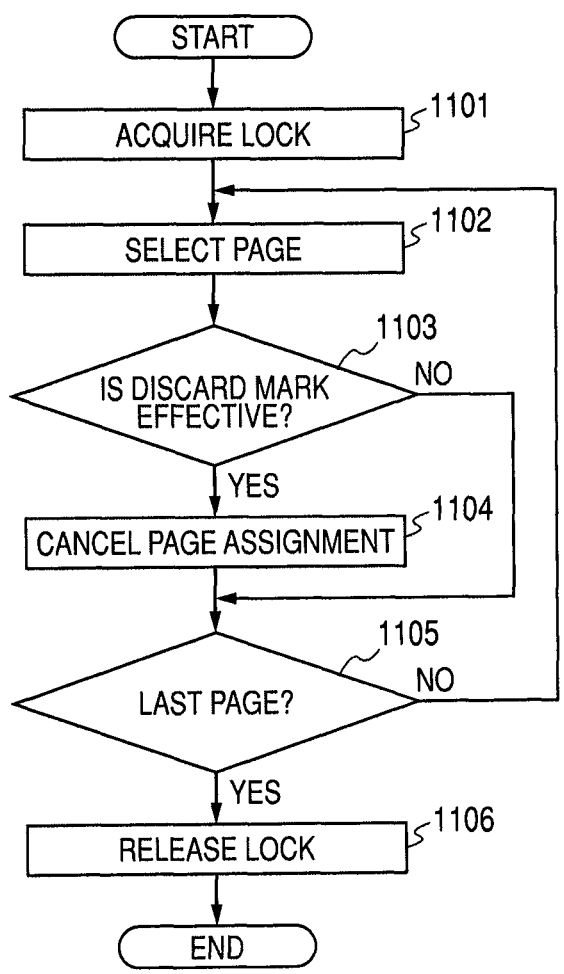
FIG. 11 is a flowchart showing a page discard process according to the first embodiment of the invention.

FIG. 11 is a flowchart showing the page discard process according to the first embodiment of the invention.

The page discard process as shown in FIG. 11 is performed at the step 804 of the pool JOB as shown in FIG. 8.

At first, the assignment management program 113 acquires a resource lock (step 1101). This is a process for prohibiting the assignment of the physical storage area to the page through another process than the page discard process being performed currently. That is, the assignment of the physical storage area to the page and its cancellation are exclusively controlled by acquiring the resource lock.

Then, the assignment management program 113 selects one of the pages in the selected virtual volume 201 (step 1102). At the step 1102 that is performed for the first time after the start of performing the page discard process, the first page of the virtual volume 201 may be selected.

Then, the assignment management program 113 determines whether or not the value of the discard mark 403 corresponding to the page selected at the step 1102 is valid (step 1103).

If it is determined at the step 1103 that the value of the discard mark 403 corresponding to the selected page is valid, the specific pattern data only is stored in the selected page. In this case, the assignment management program 113 cancels the assignment of the physical storage area to the selected page (step 1104). More specifically, the assignment management program 113 changes the value of the real page 402 corresponding to the selected page to the invalid value.

Then, the assignment management program 113 determines whether or not the selected page is the last page within the selected virtual volume 201 (step 1105).

If it is determined at the step 1105 that the selected page is not the last page within the selected virtual volume 201, the process returns to the step 1102. At the step 1102, one of the unselected pages (e.g., the next page to the previously selected page) is selected.

If it is determined at the step 1105 that the selected page is the last page within the selected virtual volume 201, the assignment of the physical storage area to all the pages in which the specific pattern data only is stored among the pages within the selected virtual volume 201 is canceled. In this case, the assignment management program 113 releases the resource lock (step 1106), and ends the page discard process.

If it is determined at the step 1103 that the value of the discard mark 403 corresponding to the selected page is invalid, the physical storage area is not assigned to the selected page, the data other than the specific pattern data is included in the selected page, or there is a high possibility that data other than the specific pattern data is written into the selected page. It is not permitted to cancel the assignment of the physical storage area to such page. Therefore, the assignment management program 113 does not perform the step 1104 and performs the step 1105.

With the above, the explanation of the page discard process is ended.

Herein, referring to FIGS. 3 and 4, a specific example of the processes as shown in FIGS. 8 to 11 will be described below.

If the virtual volume 201A is selected at the step 802, the assignment management program 113 sets the valid value to the discard mark 403 corresponding to the page to which the physical storage area is not assigned among all the pages within the virtual volume 201A (step 901). For example, when the values of the virtual page 401 corresponding to the page 301A and the page 301B are "0x0000" and "0x5000", the physical storage area is assigned to the page 301A, but not assigned to the page 301B (see FIG. 4). In this case, the assignment management program 113 sets the valid value (e.g., "1") to the discard mark 403 corresponding to "0x0000" and sets the invalid value (e.g., "0") to the discard mark 403 corresponding to "0x5000".

If the page 301A is selected at the step 902, the assignment management program 113 sequentially copies the slots of the page 301A to the memory (step 904), and makes the comparison with the specific pattern data (step 905).

If the data of all the slots within the page 301A is matched with the specific pattern data, the value of the discard mark 403 corresponding to the page 301A is kept as the valid value, and the next page 301B is selected (step 902). On the other hand, if at least one slot including the different data from the specific pattern data exists within the page 301A, the value of the discard mark 403 corresponding to the page 301A is changed to the invalid value (step 906), and the next page 301B is selected (step 902).

The same process as above is performed for the remaining pages of the virtual volume 201A. However, since a page such as the page 301B to which the physical storage area is not assigned is determined as "No" at the step 903, the above comparison is not performed.

For example, even though the value of the discard mark 403 corresponding to the page 301A is kept as the valid value as a result of comparison at the step 905, the value of the discard mark 403 corresponding to the page 301A is changed to the invalid value when the data I/O for the page 301A is subsequently performed (steps 909 and 910).

If the page discard determination process for all the pages of the virtual volume 201A is ended, the page discard process for the virtual volume 201A is performed. For example, if the value of the discard mark 403 corresponding to the page 301A identified by the value "0x0000" of the virtual volume 401 is the valid value "1", the value "0x0000" of the real page 402 corresponding to the page 301A is changed to the invalid value (steps 1103 and 1104), as shown in FIG. 4. Thereby, the assignment of the physical storage area to the page 301A is canceled.

Similarly, if the value of the real page 402 is changed to the invalid value for all the pages in which the value of the discard mark 403 is the valid value, the page discard process is ended.

Essentially, it is not required that the specific pattern data is stored in the virtual volume 201, as described above. In other words, it is not required that the physical storage area is assigned to the page of the virtual volume 201 to store the specific pattern data. However, there were conventionally some cases where the physical storage area was assigned to the page of the virtual volume 201 to store the specific pattern data, and there was no way for canceling the assignment. Therefore, the physical storage area could not be effectively used in some cases.

On the contrary, in the first embodiment of the invention, the specific pattern data is once stored in the virtual volume 201. That is, the physical storage area is once assigned to the page of the virtual volume 201 to store the specific pattern data. Thereafter, the comparison is made between the data stored in the virtual volume 201 and the specific pattern data, and the assignment of the physical storage area to the page in which the specific pattern data only is stored is canceled ex post facto. The physical storage area in which the assignment is canceled can be newly assigned to another page. Therefore, the physical storage area can be effectively used.

A second embodiment of the invention will be described below in detail using the drawings.

In the first embodiment of the invention, the physical storage area is once assigned to the page of the virtual volume 201 to store the specific pattern data and then the assignment of the invention is canceled. On the contrary, the write of the specific pattern data into the virtual volume 201 is prevented in the second embodiment of the invention.

The hardware configuration and the basic logical configuration according to the second embodiment of the invention are the same as in the first embodiment. That is, FIGS. 1 to 5, FIG. 7 and FIG. 10 are also applicable to the second embodiment. In the following, the different points of the second embodiment from the first embodiment will be described below.

Figure 12:
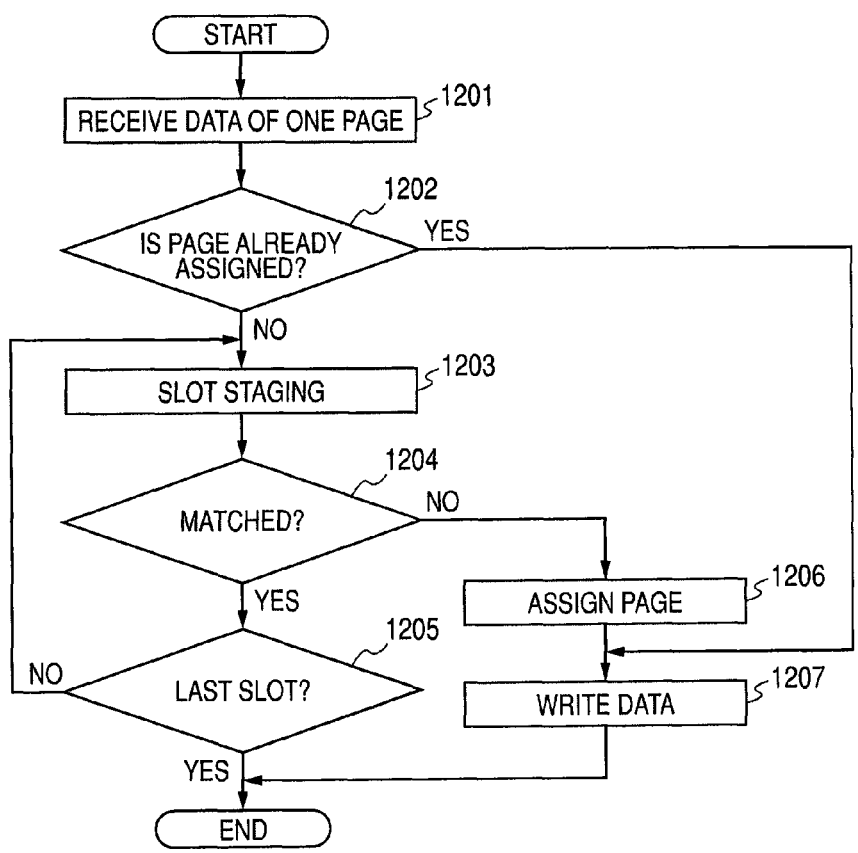
FIG. 12 is a flowchart showing a data write process according to a second embodiment of the invention.

FIG. 12 is a flowchart showing a data write process according to the second embodiment of the invention.

More specifically, FIG. 12 shows the process to be performed when the I/O control program 112 receives a data write request with the virtual volume 201 designated as the write target.

At first, the I/O control program 112 receives a data write request (step 1201). This data write request includes the data to be written and the information designating the address of the write target of the data.

The following explanation is concerned with the process performed by the I/O control program 112 in receiving the data of one page at the step 1201. If the data of plural pages is received, the following process is repeatedly performed. If the data of less than one page is received, the process as shown in FIG. 6 is performed as in the first embodiment.

Next, the I/O control program 112 determines whether or not the physical storage area is assigned to the page including the address of the write target (step 1202). More specifically, the I/O control program 112 determines whether or not the effective value (i.e., the address of any page in the pool volume 203) is registered in the real page 402 corresponding to the page including the address of the write target by referring to the assignment management table 114.

If it is determined at the step 1202 that the null value is registered in the real page 402 corresponding to the page including the address of the write target, the physical storage area is not assigned to the page including the address of the write target. In this case, the I/O control program 112 stages the data of one slot among the data to be written (step 1203). This process is performed in the same way as the step 904 in FIG. 9.

Next, the I/O control program 112 compares the staged data and the specific pattern data, and determines whether or not they are matched (step 1204). This comparison may be made in the same way as the step 905 in FIG. 9.

If it is determined at the step 1204 that the data of one slot and the specific pattern data are unmatched, the data of one page received at the step 1201 includes the different data from the specific pattern data. In this case, the I/O control program 112 assigns the physical storage area to the page corresponding to the address designated as the write target (step 1206). This assignment is performed in the same way as the step 603 in FIG. 6.

Next, the I/O control program 112 writes the data at the address designated as the write target (step 1207). This write is performed in the same way as at the step 604 in FIG. 6. If the write at the step 1207 is ended, the I/O control program 112 ends the data write process.

If it is determined at the step 1204 that the data of one slot and the specific pattern data are matched, the I/O control program 112 determines whether or not the data staged at the step 1203 corresponds to the last slot of the data of one page received at the step 1201 (step 1205).

If it is determined at the step 1204 that the data of one slot and the specific pattern data are matched, the process returns to the step 1203. At the step 1203, the I/O control program 112 stages the data corresponding to the slot of slot staged immediately after and performs a process of the step 1204 and after.

If it is determined at the step 1205 that the staged data corresponds to the last slot, the data of one page received at the step 1201 includes only the same data as the specific pattern data. In this case, the I/O control program 112 ends the data write process without performing the assignment of the physical storage area to the page corresponding to the address designated as the write target and making the write of the data into that page.

The process from the step 1203 to the step 1206 may be performed by the assignment management program 113 receiving an instruction from the I/O control program 112.

The I/O control program 112 of this embodiment may have a function of performing not only the data write process as shown in FIG. 12 but also the data write process as shown in FIG. 6. In this case, for example, the I/O control program 112 can switch the data write processes to be performed in accordance with an instruction from the manager or user.

The above data write process has been described in an instance of handling the data write request sent from the host computer 130. However, when the copy of data is performed in the copy pair (i.e., writing the data into the virtual volume 201 of the copy target) and when the restore of data is performed from the tape storage medium (i.e., writing the data read from the tape storage medium into the virtual volume 201), the same process is performed.

In any case, since the write of the specific pattern data into the virtual volume 201 is prevented, the physical storage area can be effectively used.

When the copy of data in the copy pair is performed, it is also possible to prevent the write of the specific pattern data by controlling the sending of data from the copy source, not by controlling the write of data into the copy target as above. In the following, the process in each case will be described below.

Figure 13:
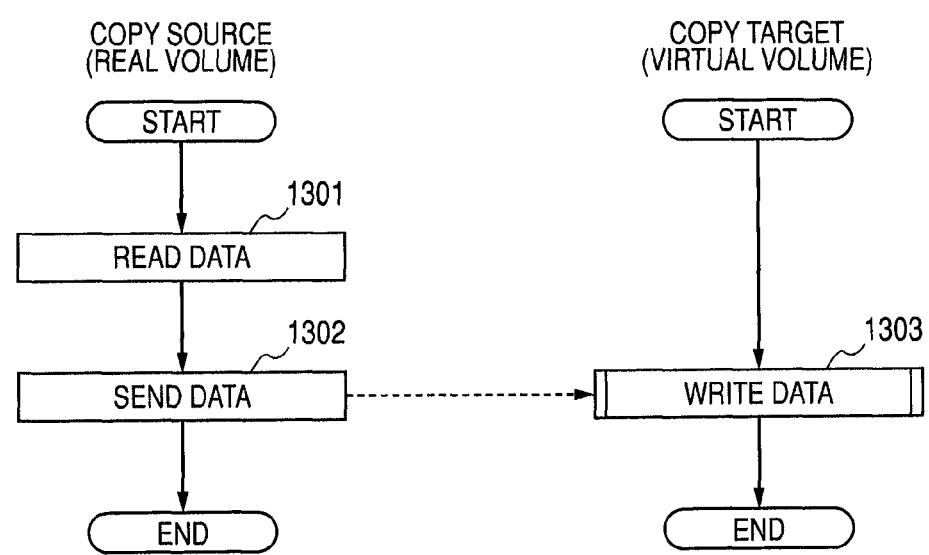
FIG. 13 is a flowchart showing a first example of data copy between the logical volumes according to the second embodiment of the invention.

FIG. 13 is a flowchart showing a first example of data copy between the logical volumes according to the second embodiment of the invention.

For example, in the copy pair over two storage systems 100, when the copy of data from the real volume 202 to the virtual volume 201 is performed, the I/O control program 112 for the storage system 100 comprising the real volume 202 of the copy source reads the data from the real volume 202 of the copy source (step 1301), and sends the read data to the storage system 100 comprising the virtual volume 201 of the copy target (step 1302).

The I/O control program 112 for the storage system 100 receiving the data sent at the step 1302 performs the data write process as shown in FIG. 12 (step 1303). Thereby, the write of the specific pattern data into the virtual volume 201 of the copy target is prevented.

Figure 14:
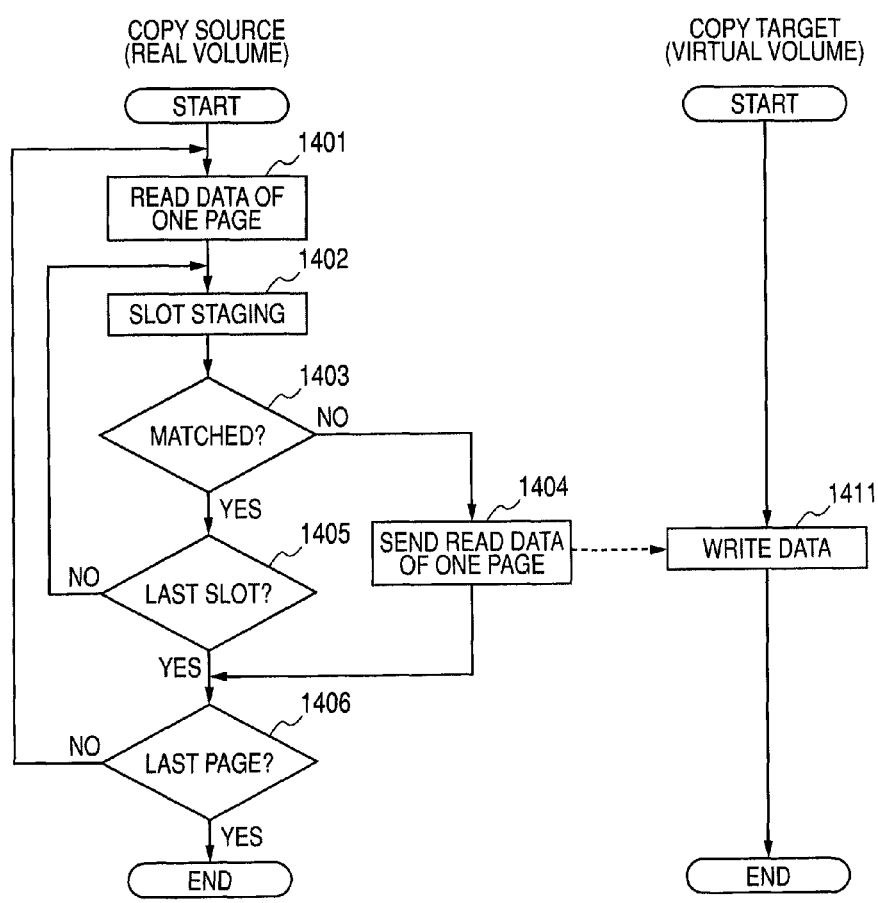
FIG. 14 is a flowchart showing a second example of data copy between the logical volumes according to the second embodiment of the invention.

FIG. 14 is a flowchart showing a second example of data copy between the logical volumes according to the second embodiment of the invention.

An instance of performing the copy of data from the real volume 202 to the virtual volume 201 in the same way as in FIG. 13 will be described below. Herein, the copy of all the data stored in the real volume 202 to the virtual volume 201 is performed.

The I/O control program 112 for the storage system 100 comprising the real volume 202 of the copy source reads the data of one page from the real volume 202 of the copy source (step 1401).

Then, the I/O control program 112 stages the data of one slot among the read data of one page (step 1402). This process is performed in the same way as at the step 904 in FIG. 9.

Next, the I/O control program 112 compares the staged data and the specific pattern data and determines whether or not they are matched (step 1403). This comparison is performed in the same way as at the step 905 in FIG. 9.

If it is determined at the step 1403 that the data of one slot and the specific pattern data are unmatched, the data of one page read at the step 1401 includes different data from the specific pattern data. In this case, the I/O control program 112 sends the data of one page read at the step 1401 to the storage system 100 comprising the virtual volume 201 of the copy target (step 1404).

If it is determined at the step 1403 that the data of one slot and the specific pattern data are matched, the I/O control program 112 determines whether or not the data staged at the step 1402 corresponds to the last slot of the data of one page read at the step 1401 (step 1405).

If it is determined at the step 1405 that the staged data does not correspond to the last slot, the process returns to the step 1402. At the step 1402, the I/O control program 112 stages the data corresponding to the next slot of the previously staged slot, and performs the process of the step 1403 and following.

If it is determined at the step 1405 that the staged data corresponds to the last slot, the data of one page read at the step 1401 includes only the same data as the specific pattern data. In this case, the I/O control program 112 does not send the data of one page read at the step 1401 to the storage system 100 comprising the virtual volume 201 of the copy target, and performs the step 1406.

The I/O control program 112 determines at the step 1406 whether or not the data of one page read at the step 1401 is the last page in the real volume 202 of the copy source.

If it is determined at the step 1406 that the read data is not the last page, the process returns to the step 1401. At the step 1401, the I/O control program 112 reads the data of the next page of the previously read page, and performs the process following the step 1402.

The I/O control program 112 for the storage system receiving the data sent at the step 1404 performs the data write process as shown in FIG. 6 to write the received data into the virtual volume 201 of the copy target (step 1411).

Since the page including only the same data as the specific pattern data is not sent at the step 1404, the physical storage area is not assigned to the page including only the same data as the specific pattern data at the step 1411.

Though the copy of data in the copy pair over the two storage systems 100 is shown in FIGS. 13 and 14, the same process may be performed in the case of the copy pair within one storage system 100 (i.e., the real volume 202 of the copy source and the virtual volume 201 of the copy target are stored in the same storage system 100).

The process as shown in FIG. 14 may be performed in the storage system 100 of the first embodiment. When the process as shown in FIG. 14 is performed in the storage system 100 of the first embodiment, the assignment of the physical storage area for the copy between the logical volumes is controlled through the process of FIG. 14, and the assignment of the physical storage area for other processes (e.g., writing the data read from the tape storage medium) is controlled through the pool JOB (see FIG. 8 and so on).

With the second embodiment of the invention as described above, the assignment of the physical storage area to the page including only the same data as the specific pattern data is prevented. Therefore, the physical storage area can be effectively used.

Though the data including the consecutive "0" only is employed as one example of the specific pattern data in the first and second embodiments, the specific pattern data may be arbitrary. To make more effective use of the physical storage area, it is desirable that the specific pattern data is selected to have the more physical storage area unassigned to the page of the virtual volume 201. More specifically, it is desirable that the data of the highest occurrence frequency pattern among the data written in accordance with the write request for the virtual volume 201 is selected as the specific pattern data.

For example, if the physical storage area is assigned to all the pages of the virtual volume 201, the assignment management program 113 may read all the data stored in the virtual volume 201 and specify the data of the highest occurrence frequency pattern before the pool JOB (FIGS. 8 to 11) for the virtual volume 201 is performed. In this case, the data of the highest occurrence frequency pattern is selected as the specific pattern data.

The assignment management program 113 stores the selected specific pattern data in the predetermined address range 303 of the pool volume 203 associated with the virtual volume 201.

Or when the data is copied as shown in FIGS. 13 and 14, the assignment management program 113 for the storage system 100 comprising the real volume 202 of the copy source may read all the data of the real volume 202 of the copy source and specify the data of the highest occurrence frequency pattern. In this case, the data of the highest occurrence frequency pattern is selected as the specific pattern data.

The I/O control program 112 of the storage system 100 including the real volume 202 of the copy source previously may send the data of the selected specific pattern to the storage system including the virtual volume 201 of the copy source.

In this way, the physical storage area can be used more effectively by using the data of the highest occurrence frequency pattern as the specific pattern data.

In the above way, the first and second embodiments of the invention aim to use the physical storage area effectively. For this purpose, in the first embodiment, after the physical storage area is once assigned to the page storing only the specific pattern data, the assignment is canceled. On the other hand, in the second embodiment, the data write process or data send process is controlled so that the physical storage area may not be assigned to the page storing only the specific pattern data from the first. In this way, the first and second embodiments have the common technical significance.

What is claimed is:

1. A second storage apparatus coupled to a first storage apparatus, the second storage apparatus comprising:
    a plurality of storage mediums providing a plurality of storage regions; and
    a controller configured to manage a virtual volume, which is a copy destination of a source volume managed by the first storage apparatus and includes a plurality of virtual storage regions,
    wherein upon receipt of first data stored in the source volume from the first storage apparatus according to a copy operation, the controller is configured to:
        determine whether the received first data matches a predetermined data pattern before allocating an unallocated storage region, to which the first data would be written, of the plurality of storage regions, to a virtual volume;
        if the first data does not match the predetermined data pattern, allocate the unallocated storage region to a first virtual storage region, and write the first data; and
        if the first data matches the predetermined data pattern, not allocate the unallocated storage region of the plurality of storage regions, to the first virtual storage region.

2. The second storage apparatus according to claim 1, wherein the predetermined data pattern is a zero data pattern.

3. The second storage apparatus according to claim 1, wherein the controller includes an I/F module coupled to the first storage apparatus.

4. The second storage apparatus according to claim 1, wherein the source volume is a real volume to which storage regions are fully allocated before receiving a write command.

5. The second storage apparatus according to claim 1, wherein the controller is configured to receive the first data of the source volume from the first storage apparatus for creating a copy pair of the source volume to the virtual volume.

6. A method in a second storage apparatus coupled to a first storage apparatus, the second storage apparatus including a plurality of storage mediums providing a plurality of storage regions; and a controller configured to manage a virtual volume, which is a copy destination of a source volume managed by the first storage apparatus, and includes a plurality of virtual storage regions, the method comprising the steps of:
    receiving first data of the source volume from the first storage apparatus according to a copy operation from the first storage apparatus,
    determining whether the received first data matches a predetermined data pattern before allocating an unallocated storage region, to which the first data would be written, of the plurality of storage regions, to a virtual volume;
    if the first data does not match the predetermined data pattern, allocating the unallocated storage region to a first virtual storage region, and write the first data; and
    if the first data matches the predetermined data pattern, not allocating the unallocated storage region of the plurality of storage regions, to the first virtual storage region.

7. The method according to claim 6, wherein the predetermined data pattern is a zero data pattern.

8. The method according to claim 6, wherein the controller includes an I/F module coupled to the first storage apparatus.

9. The method according to claim 6, wherein the source volume is a real volume to which storage regions are fully allocated before receiving a write command.

10. The method according to claim 6, further comprising the step of: receiving the first data of the source volume from the first storage apparatus for creating a copy pair of the source volume to the virtual volume.

11. A non-transitory computer readable storing medium having code for performing a method in a second storage apparatus coupled to a first storage apparatus, the second storage apparatus including a plurality of storage mediums including a plurality of storage regions; and a controller configured to manage a virtual volume, which is a copy destination of a source volume managed by the first storage apparatus, and includes a plurality of virtual storage regions, the code comprising:
    receiving first data stored in the source volume from the first storage apparatus for creating a copy pair of the source volume to the virtual volume;
    determining whether the received first data matches a predetermined data pattern before allocating an unallocated storage region, to which the first data would have been written, of the plurality of storage regions, to a virtual volume;
    if the first data does not match the predetermined data pattern, allocating the unallocated storage region to a first virtual storage region, and write the first data; and
    if the first data matches the predetermined data pattern, not allocating the unallocated storage region of the plurality of storage regions, to the first virtual storage region.

12. The non-transitory computer readable storing medium according to claim 11, wherein the predetermined data pattern is a zero data pattern.

13. The non-transitory computer readable storing medium according to claim 11, wherein the controller includes an I/F module coupled to the first storage apparatus.

14. The non-transitory computer readable storing medium according to claim 11, wherein the source volume is a real volume to which storage regions are fully allocated before receiving a write command.

15. The non-transitory computer readable storing medium according to claim 11, the code further comprising:
    receiving the first data of the source volume from the first storage apparatus for creating a copy pair of the source volume to the virtual volume.

16. A second storage apparatus coupled to a first storage apparatus, the second storage apparatus comprising:
    a plurality of storage mediums providing a plurality of storage regions; and
    a controller configured to manage a virtual volume, which is a copy destination of a source volume managed by the first storage apparatus and includes a plurality of virtual storage regions;

wherein upon receipt of first data stored in the source volume from the first storage apparatus according to a copy operation, the controller is configured to:
- determine whether the received first data matches a predetermined data pattern before allocating an unallocated storage region, to which the first data would be written, of the plurality of storage regions, to a virtual volume;
- if the first data does not match the predetermined data pattern, relate an address of a first storage region of the plurality of storage regions to an address of a first virtual storage region of the plurality of virtual storage region, and write the first data to the first storage region; and
- if the first data matches the predetermined data pattern, not relate the address of the first storage region, to which the first data would have been written, of the plurality of storage regions, to an address of the first virtual storage region.

* * * * *